United States Patent [19]

Withers

[11] Patent Number: 5,906,887
[45] Date of Patent: May 25, 1999

[54] COMPOSITE ELASTOMERIC ARTICLE FOR ADHESIVE CUSHIONING AND MOUNTING MEANS

[75] Inventor: Giles Sydnor Withers, Syracuse, N.Y.

[73] Assignee: P.C.I.Paper Conversions, Inc., Syracuse, N.Y.

[21] Appl. No.: 08/754,991

[22] Filed: Nov. 22, 1996

Related U.S. Application Data

[63] Continuation of application No. 08/509,191, Jul. 31, 1995, abandoned, which is a continuation of application No. 08/345,216, Nov. 28, 1994, abandoned, which is a continuation-in-part of application No. 08/179,754, Jan. 7, 1994, abandoned, which is a continuation-in-part of application No. 08/047,153, Apr. 13, 1993, abandoned, which is a continuation-in-part of application No. 07/931,616, Aug. 19, 1992, abandoned.

[51] Int. Cl.$^6$ .................................. B32B 3/26; B32B 7/12
[52] U.S. Cl. ...................... 428/315.5; 428/141; 428/220; 428/213; 428/313.3; 428/313.9; 428/314.8; 428/317.3; 428/325; 428/327
[58] Field of Search ...................... 428/325, 327, 428/213, 220, 141, 313.3, 313.9, 314.8, 317.3; 36/71

[56] References Cited

U.S. PATENT DOCUMENTS

| | | | |
|---|---|---|---|
| 3,691,140 | 9/1972 | Silver | 526/240 |
| 4,255,202 | 3/1981 | Swan, Jr. | 106/122 |
| 4,689,899 | 9/1987 | Larson et al. | 36/44 |
| 4,970,807 | 11/1990 | Anderié et al. | 36/28 |
| 5,024,880 | 6/1991 | Veasley et al. | 428/317.5 |
| 5,101,580 | 4/1992 | Lyden | 36/93 |
| 5,109,083 | 4/1992 | Hsieh et al. | 526/93 |
| 5,194,329 | 3/1993 | Hsieh et al. | 428/332 |
| 5,571,617 | 11/1996 | Cooprider et al. | 428/341 |
| 5,639,539 | 6/1997 | DeProspero et al. | 428/195 |
| 5,652,059 | 7/1997 | Margel | 428/403 |
| 5,679,461 | 10/1997 | Kobayashi et al. | 428/423.1 |

*Primary Examiner*—Marion McCamish
*Assistant Examiner*—John J. Guarriello
*Attorney, Agent, or Firm*—Charles J. Brown

[57] ABSTRACT

A composite elastomeric article for cushioning or mounting purposes including a mass substantially of tacky rubbery solid microspheres formed by suspension polymerization and agglomerated together in substantial contact with one another.

7 Claims, 2 Drawing Sheets

COMPOSITE ELASTOMERIC ARTICLE FOR ADHESIVE CUSHIONING AND MOUNTING MEANS

CROSS REFERENCE TO RELATED APPLICATIONS

This application is a continuation of my copending application entitled COMPOSITE ELASTOMERIC ARTICLE FOR ADHESIVE CUSHIONING AND MOUNTING MEANS, filed Jul. 31, 1995 and given Ser. No. 08/509,191 now abandoned, which was a continuation of my application entitled CUSHIONING, filed Nov. 28, 1994 and given Ser. No. 08/345,216, now abandoned which was a continuation-in-part of my application entitled CUSHIONING, filed Jan. 7, 1994 and given Ser. No. 08/179,754, now abandoned which was a continuation-in-part of my application entitled CUSHIONING, filed Apr. 13, 1993 and given Ser. No. 08/047,153, now abandoned which was a continuation-in-part of my original application entitled CUSHIONING, filed Aug. 19, 1992 and given Ser. No. 07/931,616 now abandoned.

BACKGROUND OF THE INVENTION

Solid microspheres which are tacky and rubbery and prepared by suspension polymerization are disclosed in many prior patents, including U.S. Pat. No. 3,691,140 and the several patents referred to therein and U.S. Pat. No. 5,194,329 and the several patents referred to therein. The principal uses for those prior art microspheres are as low-tack adhesives for repositionable note pads. In that application the microspheres are disposed over a substrate such as paper in a thin layer characterized in that the individual microspheres are dispersed and spaced apart and not in contact with one another. This spacing apart of the microspheres is a factor enhancing their ability to be applied, removed and reapplied to surfaces without transfer of adhesive or damage to the surface and with the low-tack adhesion needed for easy removal.

In the arts of adhesive cushioning and mounting means it is well known to use layers or slabs of elastomeric material which possess qualities of tackiness and rubberiness. In footwear, for example, U.S. Pat. No. 4,970,807 teaches the deposit in a recess within a shoe sole of small balls of resilient polyurethane or rubber. The balls are pre-coated with an adhesive such as silicone rubber so that they form a body which can be handled as a self-contained unit during assembly. U.S. Pat. No. 5,024,880 also discloses a form of tacky elastomer suitable for shock dampening. Similarly, adhesive coated foams have been widely used as mounting "dots" which typically are separated from release sheets and then pressed into adherence with a surface such as a wall to provide tacky exposed faces for releasable attachment of various objects. The 3M Corporation of St. Paul, Minn., U.S.A. has marketed one form of these prior art elastomeric products under the designation "Mounting Squares".

In none of these prior art adhesive cushioning and mounting elastomers, however, has any known use been made of solid microspheres which are tacky and rubbery and prepared by suspension polymerization as in the previously mentioned microspheres for repositionable note papers. The conventional utilization of those microspheres in very thin layers with the individual microspheres dispersed measurably apart has made them well suited for low-tack repositionable note pads but not for cushioning or mounting means.

It is a principal object of the present invention to provide improved composite elastomeric articles for adhesive cushioning and mounting purposes which utilize a specifically modified form of known solid microspheres prepared by suspension polymerization.

SUMMARY OF THE INVENTION

In accordance with the invention a composite elastomeric article is provided for cushioning or mounting purposes. The article comprises a slab of elastomeric solid microspheres formed by suspension polymerization and agglomerated together all in close contact with one another. The slab has a minimum thickness at least about five times the maximum diameter of the individual microspheres in the slab.

In one form of the article of the invention the slab includes admixed hollow elastomeric microspheres. The mass may be a pad with a minimum thickness of about 2 mm. The opposite faces of the slab may be each covered by a separate flexible surface layer. At least one of these layers may be a removable release sheet, and in some forms of the article of the invention both of the layers may be removable release sheets.

The article of the invention may serve as mounting means for releasably securing an object to a structured surface. In one form of such mounting means, opposite faces thereof are of differing evenness so that one less even face presents less tackiness to any surface to which it is secured.

The composite elastomeric article of the invention may comprise a resilient shock absorber or a cushioning component for footwear.

DESCRIPTION OF PREFERRED EMBODIMENTS

Figure 1:
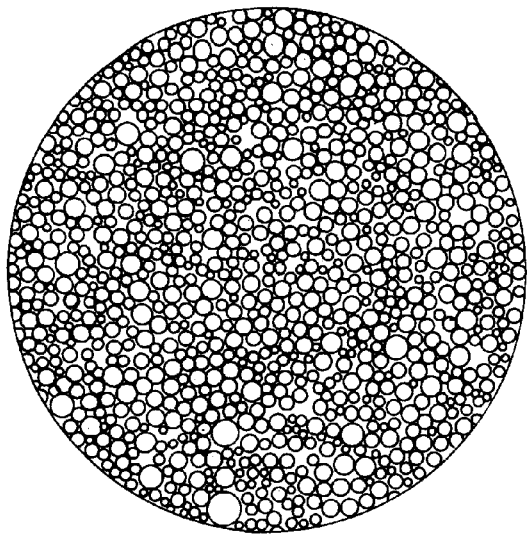
FIG. 1 is a reproduction of a 100 magnification of that surface of a sample of the microsphere mass of the invention which was not in engagement with a screen during casting and which shows the close contact among the respective microspheres.

Some specific methods for the production of the microsphere suspensions include the methods of the Examples in U.S. Pat. No. 4,495,318, particularly Example 1, and the Examples in U.S. Pat. Nos. 4,598,112, 4,786,696 and 3,691,140. As stated in U.S. Pat. No. 4,988,567 all of these methods produce tacky rubbery microspheres which are solid rather than hollow. (It should be noted that the Carbopol EX-17 mentioned in some of the Examples is apparently no longer available but may be replaced by other Carbopol grades such as Carbopol 907.)

The agglomerated mass of microspheres may be formed from these known suspensions thereof in various ways. For instance the suspension may be poured onto a fine mesh screen, such as a screen whose openings are smaller than the microspheres, while evacuating air from beneath the screen so that the suspension medium (usually water) drains through the screen openings while the mass of microspheres is retained on top of the screen. The mass may then be dried (e.g. in an oven) to evaporate adhering water; this also shrinks the mass, so that there is increased contact among the microspheres. This technique can be used to produce relatively thick masses (e.g. about 20 mm thick) in a single pass.

In one procedure an aqueous microsphere suspension was cast onto a screen made of woven polyester monofilaments while suction was applied under the screen to form a damp layer about 20 mm thick, and the resulting assembly was then placed, with the screen side down, in an oven maintained at about 93° C. to produce a dried layer about 17 mm in thickness. In this procedure screens having apertures of about 230–305 um diameter were employed and the screen was pretreated with a release agent (e.g. lecithin or silicone) before the suspension was cast thereon, so that the dried layer could be removed easily from the supporting screen.

The screen onto which the suspension is cast may be of any suitable material such as nylon filaments carrying an anti-stick agent such as molybdenum disulfide or stainless steel coated with Teflon (polytetraflouroethylene). Drying may be effected in stages. For instance, the first stage may be at a relatively low temperature, e.g. below about 50° C. (such as 44° C.) for an extended period (e.g. overnight) followed by completion of the drying at a higher temperature.

Usually the suspension polymerization to form the microspheres is carried out in the presence of a surfactant and/or dissolved colloid (suspension stabilizer). Those substances probably form thin films on the surfaces of the individual microspheres and may be regarded for purposes of this invention as part of the microspheres themselves. Such films may be retained in the mass after the suspension medium is removed; they may thus form an internal network throughout the mass.

The microsphere suspension may be treated to "wash" to reduce its content of water-soluble materials. For instance, it may be allowed to stand for an extended period, perhaps a few days, so that it "creams". In doing so the microspheres rise to the top after which much of the lower water phase is removed (half the total liquid volume may be drained off) and replaced by fresh water, preferably deionized water. The thus-diluted suspension is allowed to stand to cream again and the lower water phase is again removed to produce a concentrated suspension containing for instance about 60 to 70 percent solids, which is then cast onto the screen and dried. The creaming may also be accomplished by other techniques such as centrifuging.

Figure 2:
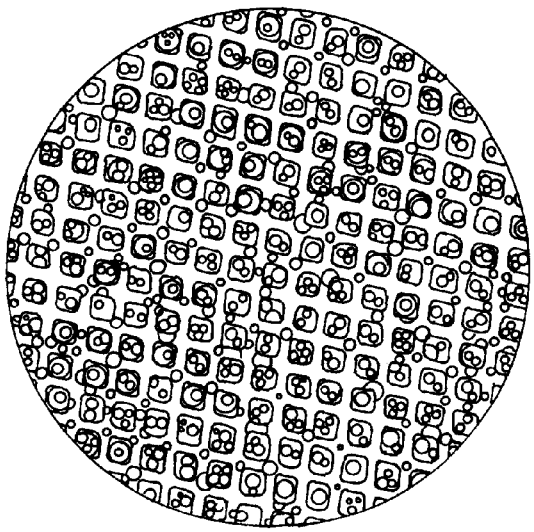
FIG. 2 is a similar reproduction of the opposite surface of the sample shown in FIG. 1 illustrating the waffle-like imprint of ridges and grooves crossing one another formed by contact with a screen during casting.

The photomicrographs in FIGS. 1 and 2 are views, with the microscope focussed on the opposite surfaces, respectively, of the mass produced by casting the microsphere suspension (without the "washing" described above) onto the screen and drying. In FIG. 1 the close contact among the microspheres of the mass is clearly visible, distinguishing it from deposits of prior art spaced microspheres applicable for use in repositionable note pads. FIG. 2 shows the waffle-like criss-crossing of ridges and grooves imprinted on the opposite face of the sample by the screen upon which the mass was cast. As usual with such suspension polymerizations, the microspheres are of varying size. The average particle size of the microspheres used to make the agglomerated mass products shown in these photomicrographs is about 45 microns. The sample of "washed" material had been covered, after its formation, with release paper on both faces; the release paper was stripped away before the pictures were taken.

The samples in each of these photomicrographs are 2 mm thick with constituent microspheres having average particle diameters of about 45 microns. Thus, if the microspheres were hypothetically aligned like beads on a straight string and were all one size, the thickness of 2 mm would correspond to that of about 44 microspheres. Since the microspheres are of varying sizes and interfit with each other with substantially no interstitial space, the number of microspheres actually making for the 2 mm thickness is considerably greater than 44.

The technique described above, in which the suspension of microspheres is cast on a screen and then dried, produces a mass which, as noted above, is substantially non-porous, in that its specific gravity is substantially that of the polymeric material itself. Thus, a sample of the mass produced from a suspension of microspheres of the polymer of 2-ethylhexyl acrylate (e.g. a suspension made according to the teachings of U.S. Pat. No. 4,495,318) has a density of 0.98 g/cm$^3$. When such a sample was soaked in a water solution of a dye (i.e. water saturated with Gentian Violet) and then removed from the dyed water, the dye was evident only at the surface of the sample. However, when such a sample is soaked in hexane and agitated it swells and breaks up into a dispersion of microspheres.

To produce colored products from essentially colorless microspheres, the suspension of microspheres may be mixed with an aqueous dispersion of a pigment before forming the cushioning mass. The pigment dispersion may contain a binder, such as an emulsion of polymer, e.g. acrylic polymer. For instance, a small amount of a blend of nonionic surfactant, e.g. Trycol 5972 POE (23) Oleyl Alcohol, water, acrylic copolymer emulsion, e.g. Neocryl A-2022, and pigment dispersion, e.g. Tint-Ayd Hansa Yellow or Phthalo Blue may be mixed into the aqueous suspension of microspheres.

In another technique for forming the mass of microspheres, the water is simply evaporated from a layer of the aqueous suspension of the microspheres. For instance, the suspension may be applied to a base web having a release surface, e.g. a paper web having a release coating such as a silicone coating, using conventional coating techniques, e.g. with a knife-over-roll coater or a slot die extruder, and then dried in an oven. The resulting product carrying the tacky layer of massed microspheres may be wound as a roll, particularly when the web has a release coating on both sides. The microsphere layer produced in this manner may be relatively thin. In one run a dry layer about 0.15 mm thick was formed when the coating knife was 0.56 mm above the roll. Thicker products may be produced from such thin layers by laminating a plurality of them together. For instance the tacky faces of two such layers, each supported on its web, may be brought together, after which one of the webs may be stripped away. This operation may be repeated until the desired thickness is attained. The successive layers may be of different densities so as to form composite products.

Another technique for forming the mass of microspheres involves freeze-drying. For instance the aqueous suspension of microspheres may be poured into a tray, frozen and then dried under vacuum.

Preferably the microsphere mass is dried to an extent that its moisture content, by weight, is less than about 10 percent, in particular less than about 5 percent, e.g. about 2 percent.

It will be understood that the various techniques for forming the masses of microspheres may be carried out batchwise or continuously.

Another aspect of this invention involves the use of bulk-polymerized alkyl acrylate (e.g. 2-ethylhexyl acrylate or other alkyl acrylate listed in U.S. Pat. No. 4,166,152) in place of the mass of microspheres. The bulk-polymerized product may be produced by simply mixing the monomer with polymerization catalyst (e.g. benzoyl peroxide or other initiator in the proportions used for formation of the microspheres) and casting the mixture onto a screen or into a suitable mold shaped to conform to the desired end-product. The mixture is brought to polymerization temperature, preferably while excluding oxygen (e.g. maintaining an atmosphere of nitrogen) to form a tacky cross-linked substantially insoluble network polymer.

The mass of microspheres may be formed into various shapes as by die-cutting or simply cutting with a knife, which may be hot and wet or covered with adhesion-preventing particles such as corn starch. Alternatively the mass may be cast into the desired shape directly or injected into a mold.

The mass of microspheres may be laminated with non-tacky layers such as fibrous woven, knitted or felted fabric, which may be of synthetic and/or natural fibers such as silk, cotton, wool, polyester, rayon, nylon, etc. This may be done by simply laminating the non-tacky fabric to a tacky mass of microspheres or between two such masses. It may also be done by placing the fabric layer on the screen before casting the suspension thereon or by using the fabric as the screen, particularly when the openings in the fabric are of such size as to trap the microspheres immediately or as the microspheres build up at said openings. The fabric layer may also be placed on an already-formed tacky mass of microspheres resting on the screen, after which additional suspension is cast onto the fabric. Heat at about 200° C. and pressure may also be applied, e.g. to the fabric side of the laminate, to improve the bond between the mass of microspheres and the fabric, e.g. by partially fusing the portion of the mass which is in contact with the fibers of the fabric. The fabric-microsphere laminate may be cut to any desired shape, e.g. a footwear insole may be formed by cutting it to fit into a shoe.

As is well known, the suspension polymerization process may be controlled to produce microspheres of controlled dimensions. Tests, thus far, of masses produced from microspheres of 35, 45, 100 and 150 micron diameters have all shown excellent results in impact tests, giving very desirable values of Insole Cushioning Index in comparison to known commercial insole cushioning materials used in athletic footwear and showing outstanding conformability to an applied heel-shaped load. In these tests the microspheres were of suspension-polymerized alkyl acrylate having more than 4 carbon atoms in its alkyl group, specifically 2-ethylhexyl acrylate.

The aqueous suspension of microspheres may be blended with other particulate materials to alter the density and physical properties of the final mass. For instance, the suspension may be blended with hollow unicellular glass microspheres ("glass bubbles") such as those sold under the trademark Scotchlite having average particulate densities of about 0.1 to 0.6 g/cc. In one procedure the microsphere mass is made from a mixture of (a) 96 parts by weight of a suspension containing 65% by weight of microspheres made by the process of Example 1 of U.S. Pat. No. 4,495,318 and (b) 4 parts by weight of glass bubble microspheres having an average particle density of 0.2 g/cc (Scotchlite bubble type K15). The resulting product has a significantly lower density than the product made without the glass bubbles and has greater stiffness.

Instead of using hollow glass microspheres one may employ hollow plastic microspheres, such as those disclosed in U.S. Pat. Nos. 4,855,170, 3,615,972, 4,075,138, 4,843,104 and 4,287,308, the entire disclosures of each of which is incorporated herein by reference. These may be blended with the solid tacky microspheres in various ways. For instance the aqueous suspension of tacky microspheres may be mixed with the hollow plastic microspheres before casting the mixture onto the screen and drying. Alternatively the hollow plastic microspheres (or their expandable precursor microspheres) may be included prior to or during the suspension polymerization step in forming the suspension of tacky microspheres. It is also within the broad scope of this invention to use the expandable precursors of the hollow microspheres, as by mixing a suspension of expandable plastic microspheres (such as the Expancel wet cake described in example 1 of Melber et. al.) with the suspension of tacky microspheres, followed by casting the mixture and then heating to dry and expand the cast product.

The volume ratio of hollow microspheres to solid tacky microspheres in the final product may be in the range of about 3:100 to 40:100, more particularly about 8:100 to 20:100 and preferably about 12:100.

To aid in producing a relatively uniform product the suspension being cast may be stabilized by the inclusion of minor proportions of a thickening agent such as a Carbopol resin to raise the viscosity and thus reduce the tendency for gravity separation of the particles of different densities, and an adhesive agent such as a high solids latex of acrylic polymer to help bond the hollow particles to the tacky microsphere particles.

In one procedure a suspension of the tacky microspheres containing 62% solids of average microsphere size of about 45 microns was made by suspension polymerization of 2-ethylhexyl acrylate in the presence of a small amount of sodium acrylate in accordance with the method described in U.S. Pat. No. 3,691,140. This was followed by doubly "washing" as described above. Then 1330.4 grams of the suspension was mixed with 55.5 grams of a 2% aqueous solution of Carbopol 9007 and 12.8 grams of a 60.5% solids of acrylic polymer emulsion. The emulsion was Neocryl XA-2202, a product of Zeneca Resins of Wilmington, Mass., which is described by its supplier as a high solids acrylic emulsion exhibiting ponded-water resistance, low temperature flexibility, dirt-pick-up resistance and excellent exterior durability, combining high elongation with good recovery, suggested for roof coatings, wall coatings and heavy duty mastics. In addition 25.6 grams of an aqueous slurry of 50% concentration of the hollow resilient polymeric microspheres were included, sold under the trademark Dualite M6001AE. These hollow microspheres have a density of 0.13 g/cc, a mean particle size of about 50 microns, and are composed of a shell of polyvinylidene chloride copolymer and a coating of calcium carbonate and produced in accordance with the above-identified U.S. Pat. No. 4,843,104. The mixture was poured onto a 24 inch square tray having a silk screen bottom and dried to produce an adhesive slab which was approximately 3 mm thick and had an approximate specific gravity of about 0.7. That specific gravity indicates that the slab contained almost 20% of trapped air, presumably introduced during the mixing operation. Slabs of greater thickness were prepared by adhering multiple 3 mm slabs.

Tests of shock attenuating properties for athletic footwear were conducted on these slabs in accordance with the ASTM tentative test method published by ASTM Subcommittee F08.54, March 1994, using its Procedure A. That involves gravity driven impact of an 8.5 kg mass dropped from a height of 50 mm for force application. The test slabs were of 3 mm, 6 mm and 9 mm thickness as compared to slabs of the same thickness produced from the suspension of tacky microspheres alone. It was found that the slabs made with the addition of hollow microspheres gave similar values of "peak g" but very much higher (well over 30% higher and in some cases 50% to 80% higher) values of "energy return". This is unusual inasmuch these values are usually related to each other; that is, a rise in energy return of a cushioning material is usually associated with a rise in peak g.

Therefore the microsphere masses are particularly suitable for energy absorbing padding in the soles of footwear. Pads thereof may also be positioned in or on the inner side walls of the footwear. In the manufacture of athletic shoes a preformed cushioning pad of microsphere mass may be placed at the appropriate position in a mold for the sole and the remainder of the sole may be formed around it, as by introducing sole-forming materials (e.g. components which react to form an elastomeric polyurethane) in a conventional manner into the mold.

Figure 3:
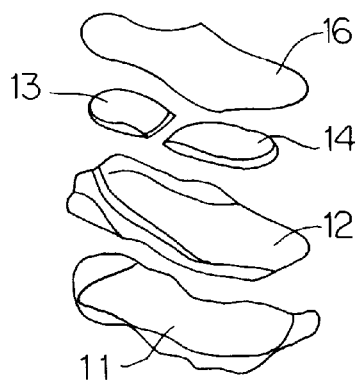
FIG. 3 is an exploded view of the bottom components of an athletic shoe including a cushioning element made of the composite elastomeric product of the invention.

An example of the use of the microsphere mass in an athletic shoe is illustrated in FIG. 3. The shoe includes an outsole 11 on which is located a midsole 12 carrying a heel cushion 13 and forefoot cushion 14. Each of the cushions 13 and 14 is composed of the microsphere mass of this invention. Disposed over the cushions 13 and 14 is a conventional sockliner 16. The midsole 12 may have recesses (not shown) shaped to receive the cushions 13 and 14. A layer of the microsphere mass may also be placed over all or portions of the outsole 11 between it and the midsole 12.

Figure 4:
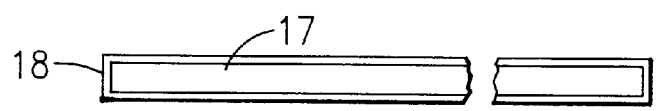
FIG. 4 is a cross section partly broken away illustrating a chair pad made of this composite elastomeric product.

FIG. 4 very simply illustrates the use of the composite elastomeric article of the invention as a chair pad. It includes a central layer 17 composed of the tacky microsphere mass of the invention within an envelope 18 of flexible film having a non-tacky surface, such as a think film perhaps 0.1 mm or less in thickness of an elastomeric material.

For some purposes, as when it is to be used in slab form as a wheelchair or bed pad the tacky mass of microspheres may carry on one or both faces a non-adhesive layer such as a layer of elastomeric film, as previously discussed. For other purposes such as when the mass is to be utilized as all or part of a midsole cushion between the outsole and insole of an athletic shoe, the tackiness of the mass may be used to adhere it directly to the adjacent layers. However it is also within the scope of the invention to increase the bonding to those layers, as by the use of an applied adhesive or by use of applied heat and pressure.

The microsphere masses of this invention have numerous other uses. For instances such masses may be employed as wheel chair or bed pads, operating room pads and positioners, patient positioner pillows and rolls, etc. They may be used as padding in protective garments, such as linings of helmets, elastic knee and elbow pads, shin guards and baseball gloves. They may be incorporated in gymnasium mats or gymnastic equipment or in energy absorbing walls at sporting events to cushion wall impact. They may be used for sound absorption. They may be sandwiched between metal structures such as shock absorbers or on or between metal panels to quiet machinery. They may be used in loudspeakers to isolate the conventional vibrating cone of the speaker from its housing. They may be employed as intermediate layers in automobile tire walls. Still another use is in internal and external prostheses, such as breast implants of microsphere masses encapsulated in a safe biocompatible membrane, or as external breast protheses.

Grip wrap strips for handles may be prepared by casting or otherwise applying the microsphere layer onto a layer of rubbery polyurethane film. The resulting composite with the tacky surface of the microsphere layer covered by another removable non-tacky film, release paper or film coated with permanent adhesive, may then be cut into strips. Those can be used as grips by winding them around handles with the polyurethane film on the outside, the underlying microsphere layer serving to absorb impact and vibration and filling any voids in the surface of the handle.

The microsphere masses may be employed to cushion floors, such as those used for sports or work, including indoor and outdoor running tracks. A simple floor may have an upper layer of rubber or plastic laminate cushioned and bonded to the base surface by a layer of microsphere mass. Another floor may have a durable textured surface under which there are, successively, a layer of microsphere mass, a fiber glass reinforcing layer and an underlying layer of microsphere mass for bonding to the base surface.

The microsphere masses may also be employed as self-sticking re-usable, removable, mounting material, in place of the well known "Mounting Squares" to hang display materials such as papers, pictures, notes, posters, decorations, maps, etc. on various walls surfaces, such as wood, plaster, brick, glass, tile, metal, formica, porcelain, concrete, blackboards. For such use the mass may be in the form of a square, rectangle or circle or other shape having a thickness of about 3/16 inch or less, e.g. about 1/8 inch, covered, as in conventional, on both sides with a removable release sheet (e.g. release paper) to protect it during transportation and storage.

Figure 5:
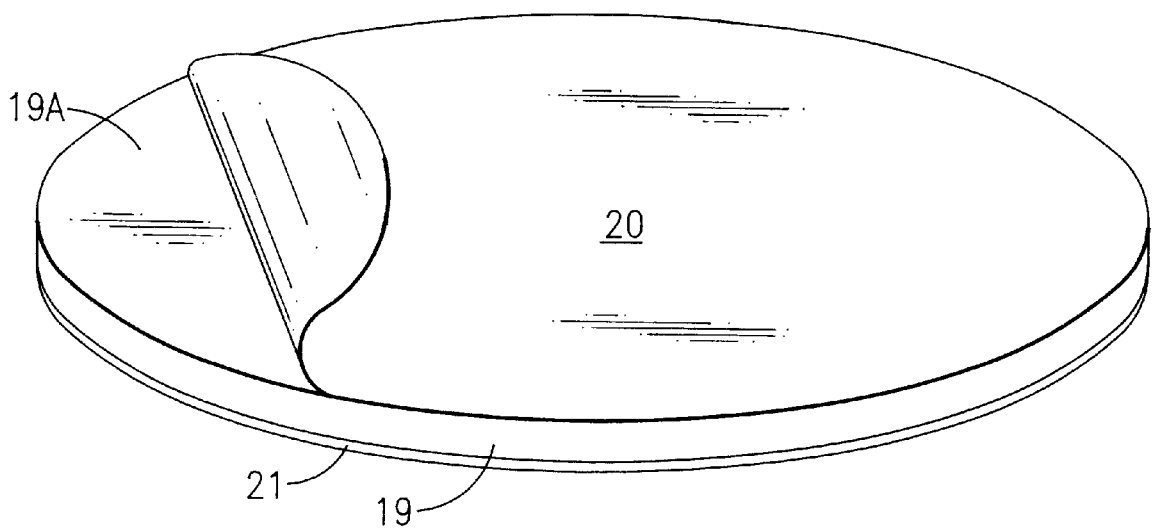
FIG. 5 is a perspective view showing a mounting pad made of the composite elastomeric product of the invention.

FIG. 5 is a simplified illustration of a mounting pad in accordance with the invention. It includes a central layer 19 composed of the tacky microsphere mass of the invention with release sheets 20 and 21 on opposite sides of that central layer 19. The release sheet 20 is shown partly peeled away. The outline of the article shown in FIG. 5 is shown as circular, though it may be rectangular or any other shape. One face of the central layer 19 is less even as compared to the other face. For example the face 19A in FIG. 5 should have the previously described waffle-like ridges and grooves crossing one another formed by contact with the screen upon which the microsphere mass was cast. The opposite face of the central layer 19, which is not visible in FIG. 5, is relatively smooth as compared to the less even face 19A. When the release sheets 20 and 21 are removed the central layer 19 is applied to a structural surface such as a wall with its smooth face contacting that surface. The less even face 19A is then disposed outwardly to receive the object to be mounted. The smooth face achieves a substantially greater degree of adherence to the wall surface than the less even face 19A achieves with respect to the object being mounted. Put another way, it is easier to remove the mounted object from the less even face 19A than it is to peel the layer 19 away from the surface upon which it is adhered.

The scope of the invention is to be determined by the following claims rather than the foregoing description of preferred embodiments.

I claim:

1. In a composite elastomeric article used at least for cushioning purposes, the improvement which comprises
    a) a mass of elastomeric solid microspheres formed by suspension polymerization and agglomerated together all in contact with one another,
    b) said mass having a minimum thickness at least about five times the maximum diameter of the individual microspheres in the mass, and
    c) a separate surface layer disposed over a surface area of said mass.

2. An article according to claim 1 wherein the mass also includes admixed hollow microspheres.

3. An article according to claim 1 wherein the mass is a pad having a minimum thickness of about two millimeters.

4. An article according to claim 3 wherein opposite faces of said pad are each covered by a separate flexible surface layer.

5. An article according to claim 3 wherein the pad comprises mounting means for releasably securing an object to a structural surface and opposite faces of the pad are of differing evenness so that one less even face presents less tackiness to any surface to which it is secured.

6. An article according to claim 3 wherein the pad comprises a resilient shock absorber.

7. An article according to claim 3 wherein the pad comprises a cushioning component for footwear.

* * * * *